United States Patent [19]

Taylor

[11] Patent Number: 4,546,789

[45] Date of Patent: Oct. 15, 1985

[54] VALVED ACCESS FITTING

[76] Inventor: Robert R. Taylor, 6 Mount Airy Pl., Morristown, N.J. 07960

[21] Appl. No.: 480,741

[22] Filed: Mar. 31, 1983

[51] Int. Cl.[4] ............................................. B08B 9/06
[52] U.S. Cl. ................................ 137/245.5; 4/255; 4/256; 137/315; 137/317; 251/147; 285/339; 285/361
[58] Field of Search ............ 137/317, 315, 244, 245.5; 4/255, 256, 295; 251/147; 285/361, 396, 402, 339, 421; 222/151

[56] References Cited

U.S. PATENT DOCUMENTS

| 498,357 | 5/1893 | Mehring | 137/317 |
|---|---|---|---|
| 831,722 | 9/1906 | Holmes | 4/256 |
| 993,661 | 5/1911 | Dudley | 285/339 |
| 1,164,892 | 12/1915 | Townsend | 4/255 |
| 1,624,168 | 4/1927 | Gschwind | 137/245.5 |
| 1,695,207 | 12/1928 | Sangster | 251/147 |
| 1,885,977 | 11/1932 | Denison | 4/256 |
| 1,938,064 | 12/1933 | Carmine | 4/256 |
| 2,039,467 | 5/1936 | Walsh | 4/255 |
| 2,874,981 | 2/1959 | Brady | 285/339 |
| 3,936,892 | 2/1976 | Miller | 4/255 |

Primary Examiner—George L. Walton
Attorney, Agent, or Firm—Kenyon & Kenyon

[57] ABSTRACT

A valved fitting for a sewer or drain line access is described which permits easy sewer line entry. The fitting includes a large-straight-bore valve body and a housing which is adapted for connection to a sewer line. Embodiments include removable and permanently attached fittings. A further feature is a flexible hose which attaches to the housing and can be used to prevent leakage of sewer liquids when the sewer line is to be cleaned.

9 Claims, 5 Drawing Figures

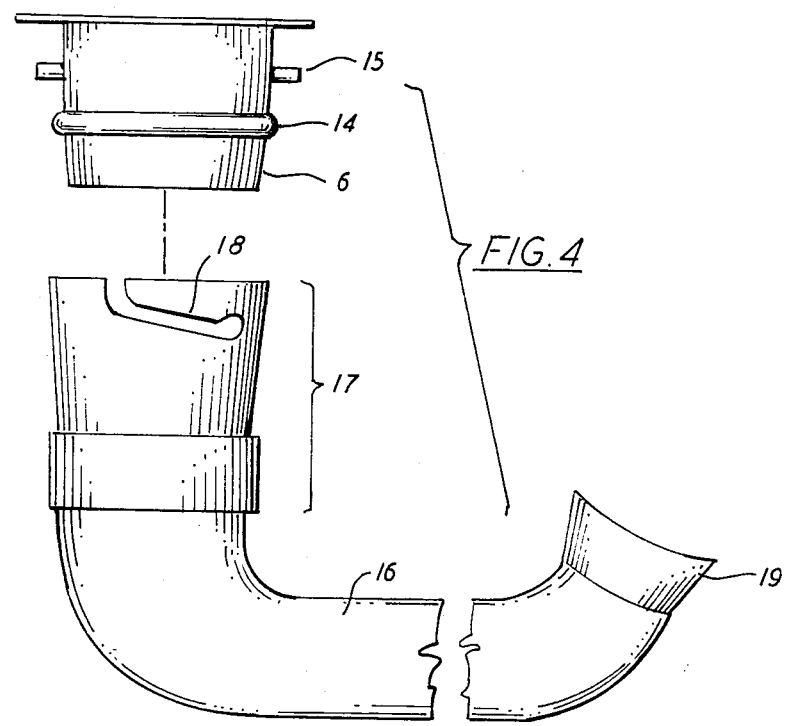
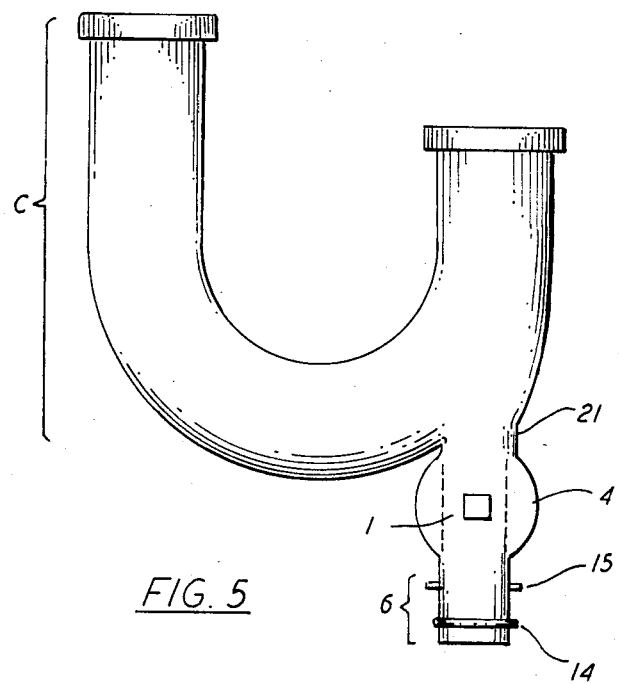

VALVED ACCESS FITTING

BACKGROUND OF THE INVENTION

In the plumbing field, it is common to provide sewer lines, soil lines and drain lines with an access joint which will permit the removal of sewer or drain obstructions. Such access joints typically are sealed by means of a removable, threaded plug which is screwed into the access. Access plugs often rust or otherwise seize to the joint threads thereby preventing their removal and causing difficulty when a sewer blockage is to be removed. Several clean-out attachments are known which are said to make access and cleaning operations easier than would be provided by a clean-out plug and access joint; see, for example, U.S. Pat. Nos. 3,936,892, 3,805,826 and 3,927,860. These attachments and access fittings, however, do not prevent sewer back-up flow when a sewer line fitted with them is being cleaned. Moreover, sink traps fitted with such attachments tend to leak and cause soiling of the surrounding area.

It is, therefore, an object of the invention to develop an access fitting which will prevent uncontrolled discharge of backed-up sewerage and waste. A further object is the development of an access fitting which will permit sewer line cleaning without necessitating the removal of backed-up liquids in the line.

SUMMARY OF THE INVENTION

The valved access fitting of the invention is a valved plug for a sewer line or a drain line access which will allow easy entry of a mechanical cleaning apparatus and will substantially prevent leakage of sewer liquids when it is an "off" position. It can be employed in combination with a hose which will obviate the necessity for removal of backed-up liquids in the line when the line is to be cleaned.

Generally, the fitting is a large-straight-bore valve body and valve housing having inlet and outlet ports which is adapted for connection to a sewer line through the outlet port.

The outlet port may be connected to a neck on which is removably mounted a coaxial, flexible, movable collar. The neck and collar fit into the pipe access and by adjusting the position of the neck in the collar, the collar is adapted to act as a seal.

Alternatively, the fitting may be permanently combined with a drain trap pipe. In this embodiment, the valve housing is permanently connected to the pipe by means of a barrel so that the pipe, barrel, valve body and housing form a passageway. The construction of the valve body and housing is as described above. The location of the valve body, housing and barrel is between the ends of the pipe.

A further feature of the fitting is a flexible hose having an inside diameter substantially the same as the valve bore diameter. The flexible hose has a connector end which is adapted for sealable attachment to the inlet port. The inlet port, in turn, is adapted to receive the connector end of the flexible hose.

The preferred valved fitting of the invention, the configuration of which may be either removable or permanently attached to a sewer line, is one having several or all of the following features. The inlet and outlet ports have substantially the same diameter and cross-sectional shape as the valve bore. The valve body is cylinder shaped and has a handle attached for turning with the human hand. The valve body and housing have a stop-cock configuration and are mutually adapted to provide sealable movement of the valve in the housing. The neck is at least partly conically-shaped and has its increasing cross-sectional diameter directed away from the outlet port. The neck is threaded on its outside surface and the collar may have corresponding inside threads or may be smooth. The collar is made of elastomeric material and can be of different thicknesses so that a single valve body, housing and neck can be used with collars of various thicknesses to fit sewer line accesses of differing diameters.

BRIEF DESCRIPTION OF THE DRAWINGS

FIGS. 1 through 5 illustrate various embodiments of the access fitting.

FIG. 1 shows a perspective view of the fitting in conjunction with a sewer pipe clean-out access.

FIG. 2 shows a schematic cross-sectional view of the fitting of FIG. 1.

FIG. 3 shows a three view drawing of the access fitting.

FIG. 4 shows the details of the flexible hose with connector end and an adapted inlet port.

FIG. 5 shows a drain trap with a permanently attached access fitting and a flexible hose.

DETAILED DESCRIPTION OF THE INVENTION

Figure 1:
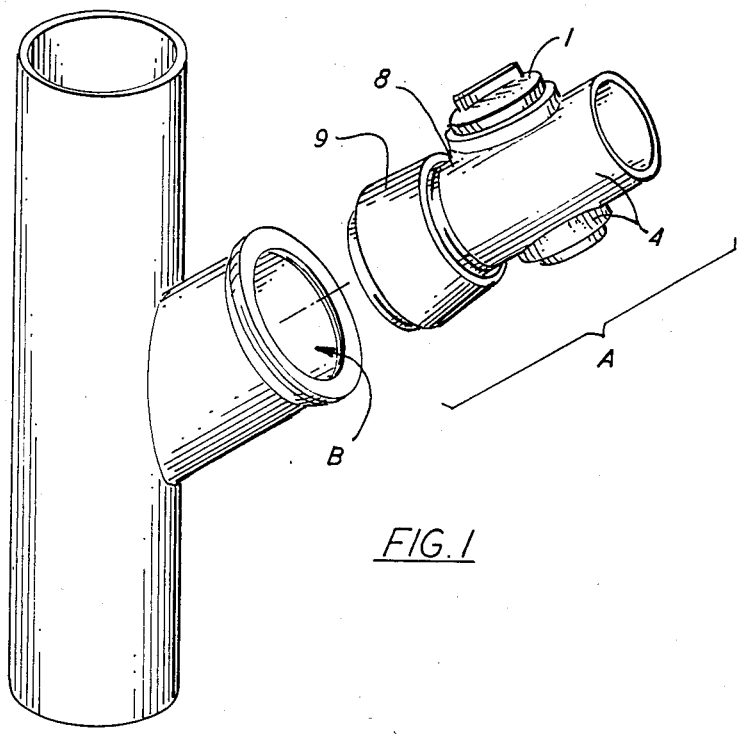

The valved access fitting of the invention permits relatively easy access to sewer pipe obstructions and allows their removal without causing uncontrolled sewer liquid outflow through the access. Generally, the access fitting is a large-straight-bore valve body and valve housing with inlet and outlet ports. It is removably or permanently fitted to an access by means of a neck and collar or barrel respectively. The valve can be turned and does not seize as would be common for access plugs. Consequently, many years after installation of the access fitting, access to the sewer line can easily be obtained simply by rotating the valve body. The invention also includes a flexible hose for attachment to the inlet port of the fitting. The flexible hose will direct liquid which may flow out of the valve when the valve is open or may be raised above the standing liquid level thereby preventing its flow onto the surrounding premises. The access fitting, however, can be used alone or in conjunction with the flexible hose.

A preferred embodiment is a combination of the access fitting and the hose. In this embodiment, as in others, the passageway of the fitting and hose is adapted to permit passage of a mechanical pipe cleaning apparatus. Accordingly, the inlet port, valve bore, outlet port, neck or barrel and hose all have substantially the same inside diameter which is of a size to permit passage of the cleaning apparatus.

The fitting may be embodied in at least four differing arrangements and those skilled in the plumbing arts will recognize that additional arrangements are also possible. These arrangements include the removable fitting with a flexible collar, the removable fitting in combination with a flexible hose, the fitting permanently attached to a drain pipe such as a sink "U" tube or "J" bend, and the permanently attached fitting in combination with the flexible hose. In any of these embodiments, the fitting will comprise a valve body with a large bore, and a valve housing which are adapted to permit sealable movement of the valve body in the housing. Typically, the valve body will be slightly conically shaped and will be held in the housing by a spring means attached to the smaller diameter end of the valve body. A turning means such as a handle or adaptor for a wrench means will be present on the other end of the valve body.

Typically, the end of the hose opposite the connector and may be funnel shaped although other shapes may also be used. This will function as a catch basin for sewage material not removed during the cleaning apparatus. Moreover, it will allow water to be poured through the flexible hose into the sewer line.

The fitting may be used in place of a sewer line clean out plug and will allow access to the pipe by opening the valve. It may also be used as a sink drain trap plug which also will permit access to the trap by opening the valve.

A typical example of the use of the valve is as follows. A household sewer line with a clean-out access will be plugged. If the line runs to a sink, it is likely that the sink will be filled with water which will probably contain the usual household drain cleaning liquids such as sulfuric acid or lye. If a drain plug had been used to seal the drain clean-out access, it would be necessary to remove the plug and the liquid in the sink would be drained into a pail. Typically, in situations like this, liquid and slop fall on the floor. With the access fitting of the invention, however, draining the sink is not necessary. When using the access fitting to handle this problem, the flexible hose is attached to the inlet port of the fitting. The other end of the hose is held up higher than the liquid in the sink, and the valve is opened. Next, a mechanical drain cleaning apparatus is guided through the flexible hose, through the fitting, including the inlet port, the valve bore, the outlet port and the barrel and into the trap. It is then guided to the sewer line obstruction and turned on. Removal of the obstruction will be observed when the liquid in the sink begins to drain. The hot water usually will then be poured down the sink and will facilitate removal of the obstructive material in the sewer line. In this manner, it is not necessary to drain the sink. Observation of removal of the sink obstruction is easily determined and sewage and grime covering the cleaning apparatus are flushed down the sewer line. The hot water will also clean the drain cleaning apparatus. At the conclusion of the cleaning process, the apparatus will be pulled out of the fitting and hose and it will not be covered with sewer muck as it otherwise would be.

The same process can be used when the access fitting is a part of a primary sewer line. Of course, the size of the fitting and that of the hose, if used, would be substantially larger and the fitting may be removable or permanent. If the line is not backed-up past the fitting, use of the hose is not necessary.

The invention will now be further illustrated by reference to the Figures.

FIG. 1 shows removable fitting A with valve body 1, housing 4, neck 8 and collar 9 as it would be arranged for placement into sewer line access B.

Figure 2:
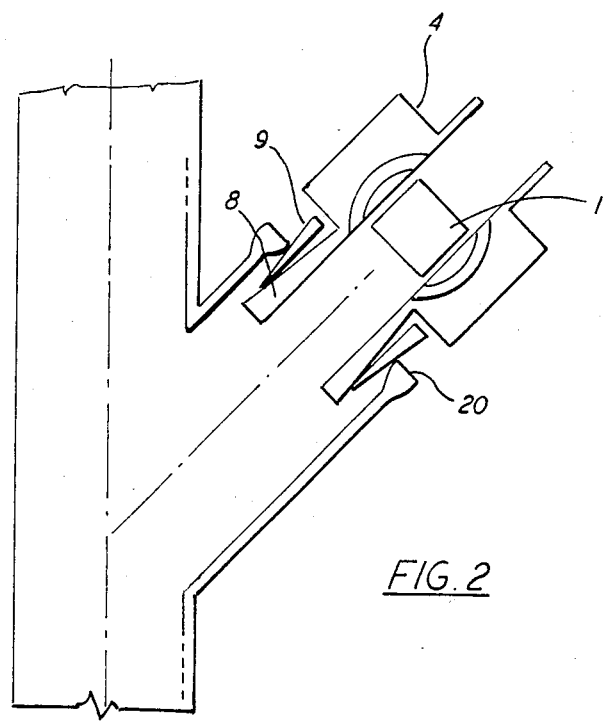

FIG. 2 shows a cross-sectional view of FIG. 1. Neck 8 is turned inside collar 9 after fitting placement thereby sealing collar 9 against the lip 20 of access B.

Figure 3:
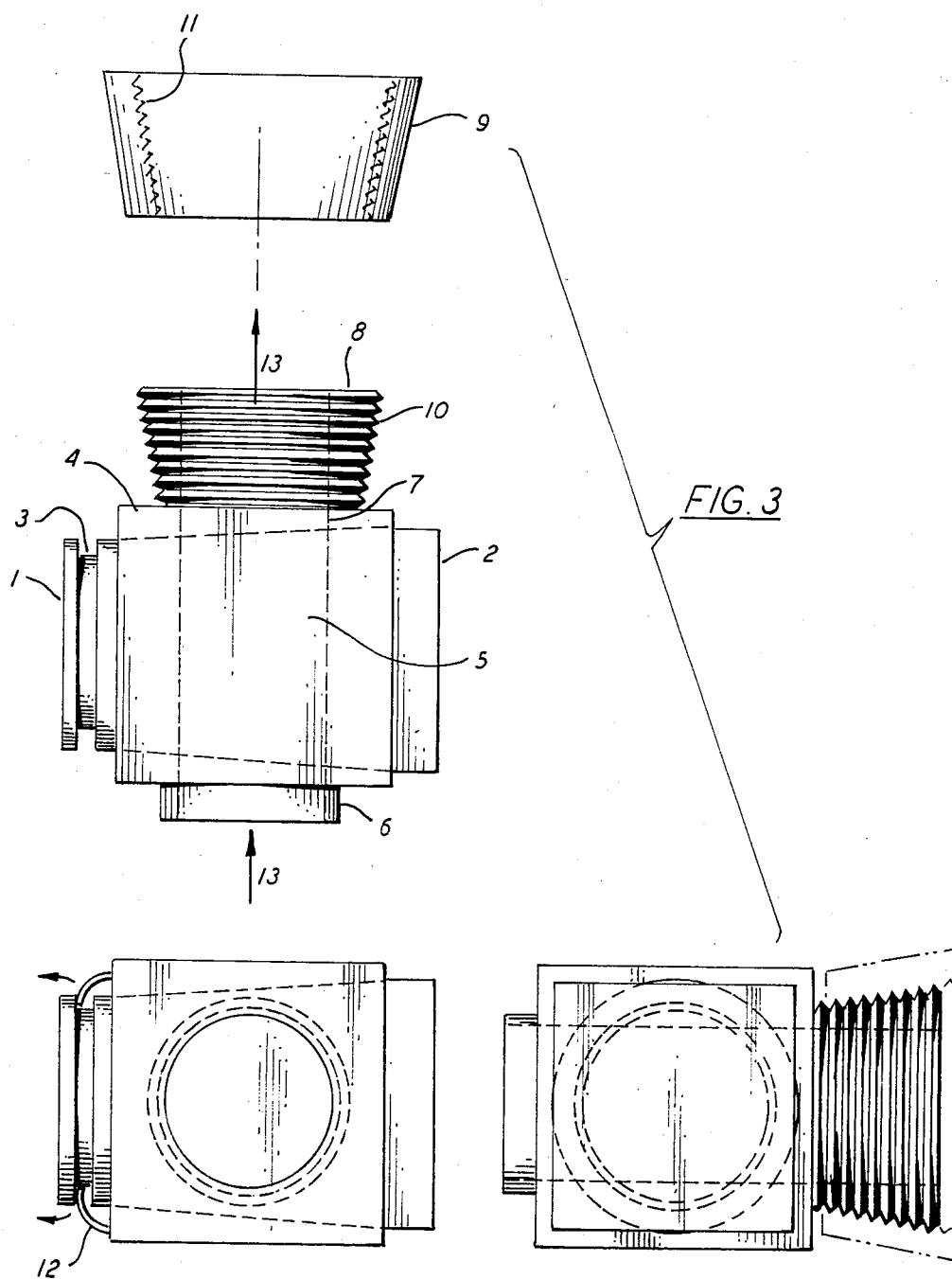

FIG. 3 shows a stop-cock valve design for the removable fitting embodiment of the invention. Slightly conically shaped valve body 1 having handle 2 on the larger diameter body end and circumferential groove 3 on the smaller diameter body end, sealably and movably fits into valve housing 4. Valve body 1 is held in housing 4 by a bowed spring clip 12 fitting into groove 3. The bore 5 of valve body 1 is straight and when rotated to an open position, aligns with inlet port 6 and outlet port 7 of valve housing 4. Attached to outlet port 7 is neck 8 surrounded by collar 90 made of an elastomeric material such as neoprene. The outside surface of neck 8 is threaded with threads 10 which fit corresponding threads 11 on the inside surface of collar 9. Passageway 13 made by inlet port 6, bore 5, outlet port 7 and neck 8 forms axially straight, cylindrically shaped opening through the fitting when body 1 is in an open position. The cross-sectional diameter of passageway 13 is the same throughout. Body 1, housing 4 and neck 8 are made of a metal such as brass, on aluminum or copper or a high strength plastic such a polyethylene, polyvinyl chloride (PVC) and the like.

FIG. 4 shows a detailed view of the flexible hose and adapted inlet port. Inlet port 6 is circumferentially grooved and fitted with "O"ring 14. Port 6 also has protruding pins 15 adapted to connect with flexible hose 16. Hose 16 has connector end 17 made of high strength plastic which is adapted in a movable, sealable fashion to fit inlet port 6. End 17 has on its inside surface slots 18 into which pins 15 fit so that when end 17 is pushed onto port 6 and rotated, end 17 is locked onto port 6. Funnel shaped end, 19, which is opposite end 17, is also present on hose 16.

FIG. 5 shows fitting A permanently connected to a sink drain trap C. Body 1 and housing 4 join trap C through barrel 21. Inlet port 6 is also shown with ring 14 and pins 15.

It will be apparent to those skilled in the art that the invention includes additional embodiments within the scope of the description herein. The embodiments herein provided are given as illustrations rather than limitations of the invention.

What is claimed is:

1. A removable valved access fitting comprising a valve body with a large, straight bore and a valve housing having inlet and outlet ports which ports substantially align with said bore when said body is in an open position, said housing being adapted for connection to a sewer line through said outlet port, said fitting adapted with an inlet port open to the environment to permit passage of a mechanical sewer cleaning apparatus through said inlet port, valve bore, and said outlet port, a removable sealable collar means adapted to be fitted on a neck of said outlet port, said collar means being wedgeable within said sewer line to retain said fitting therein, thereby said collar means being easily insertable and removable on said outlet port to prevent seizing between said sewer line and said fitting often caused by corrosion and so that a sewer blockage can be removed without the removal of said fitting from said sewer line, said inlet port adapted to receive a removable hollow connector; and a flexible hose having an inside diameter substantially the same as that of said valve bore, a connector end adapted for removable, sealable attachment to said inlet port and adapted to permit passage of said mechanical cleaning device through said flexible hole, said inlet port, said valve bore, said outlet port and into said sewer line for removal of sewer line blockage.

2. A valved access fitting according to claim 1 wherein said body and said housing have a stop-cook design and are mutually adapted for sealable movement of the body in the housing, and said outlet port is connected to said neck on which is removably mounted said collar means, said collar means being a substantially coaxial, flexible, rotatble collar, said neck and said collar being adapted for placement into said sewer line.

3. A fitting according to claim 2 wherein said inlet and outlet ports have substantially the same diameter and cross-sectional shape as said bore, said neck is partially conically shaped with an increasing cross-sectional diameter directed away from said outlet port, and has threads on its outside surface, said collar is made of elastomeric material, is adapted to fit said conically shaped neck, said valve body is cylinder shaped and has a means on one end adapted for turning said body, and said valve body and housing are mutually adapted to provide sealable movement of the valve body in the housing.

4. A fitting according to claim 3 wherein said valve body is slightly conically shaped and is held in said housing by a spring means attached to the valve body end opposite said turning means.

5. A fitting according to claim 4 which will fit a sewer line clean out access and will allow entry into said line by opening said valve body.

6. A fitting according to claim 1 wherein said housing is permanently connected to a drain trap pipe.

7. A fitting according to claim 6 wherein said drain trap pipe is connected to said valve housing outlet port by a barrel, and said pipe, barrel, outlet port, valve bore, and inlet port form a passageway, said valve body and housing comprising a large, straight bore stop cock oonfiguration mutually adapted to provide sealable, rotatable movement of the body in the housing.

8. A device according to claim 7 wherein the ends of said pipe are adapted for attachment to a plumbing fixture and sewer line and said barrel is connected to said pipe between said ends.

9. A device according to claim 8 wherein said barrel is connected to the portion of said pipe nearer the sewer line end of the pipe.

* * * * *